United States Patent [19]
Haseley et al.

[11] Patent Number: 5,602,757
[45] Date of Patent: Feb. 11, 1997

[54] VIBRATION MONITORING SYSTEM

[75] Inventors: Robert K. Haseley, Mooresville; Paul A. Kirkpatrick, Charlotte, both of N.C.

[73] Assignee: Ingersoll-Rand Company, Woodcliff Lake, N.J.

[21] Appl. No.: 326,448

[22] Filed: Oct. 20, 1994

[51] Int. Cl.$^6$ .............................. G06F 11/32; G06F 17/14
[52] U.S. Cl. .............. 364/551.01; 364/550; 364/551.02; 364/474.19; 340/683; 340/635; 73/658; 73/579
[58] Field of Search .............................. 73/660, 593, 658, 73/659, 661, 579; 364/550, 508, 138, 551.02, 474.19, 474.17, 724.06, 726; 340/683, 680, 635; 324/555

[56] References Cited

U.S. PATENT DOCUMENTS

| | | |
|---|---|---|
| 4,424,709 | 1/1984 | Meier, Jr. et al. . |
| 4,520,674 | 6/1985 | Canada et al. ............................ 73/660 |
| 4,559,828 | 12/1985 | Liszka ...................................... 73/658 |
| 4,885,707 | 12/1989 | Nichol et al. ....................... 364/551.01 |
| 5,422,824 | 6/1995 | Biehler et al. .......................... 364/494 |

OTHER PUBLICATIONS

Vibration Analysis II, Public Seminar, Developed by James E. Berry, P. E., Titled: Concentrated Vibration Signature Analysis and Related Condition Monitoring Techniques No Date.
Vibration Analysis III, Public Seminer, Developed by James E. Berry, P. E., Titled:Introduction to Special Vibration Diagnostic Techniques and How to Properly Specify Narrowband Spectral Envelope Alarms No Date.
Vibration Analysis Advanced, Public Seminar Developed by James E. Berry, P.E., Titled: Advanced Vibration Diagnostic and Reduction Techniques No Date.

*Primary Examiner*—Emanuel T. Voeltz
*Assistant Examiner*—Kamini S. Shah
*Attorney, Agent, or Firm*—Michael M. Gnibus

[57] ABSTRACT

A predictive vibration monitoring system for a machine includes a microcontroller and a machine to be monitored. The machine to be monitored includes at least one rotative element. At least one sensor is operatively connected to the machine. The at least one sensor is operable to convert mechanical motion generated by the at least one rotative element into a corresponding electrical signal. The at least one sensor inputs the corresponding electrical signal to the microcontroller. A communication means is disposed between the microcontroller and the monitored machine. The communication means enables the microcontroller to correlate a predetermined operational state of the monitored machine with a corresponding electrical signal generated by the at least one sensor. A memory means communicates with the microcontroller and stores a predetermined logic routine, at least one corresponding electrical signal and at least one predetermined key frequency of the at least one rotative element of the machine to be monitored. The microcontroller utilizes the predetermined logic routine to process the corresponding electrical signal into corresponding vibration data of the monitored machine. The microcontroller compares the corresponding vibration data with the at least one predetermined key frequency to predict the present and future condition of the at least one rotative element.

21 Claims, 4 Drawing Sheets

VIBRATION MONITORING SYSTEM

BACKGROUND OF THE INVENTION

This invention generally relates to a frequency vibration monitoring system, and more particularly to a system for analyzing vibration signatures to predict and to detect changes in machinery condition.

By design, machinery having rotative elements, which are couplingly connected, experience vibratory motion. This vibratory motion may be generated by such rotative elements as the following: machine bearings, such as bearing races, or defective ball bearings; misalignment of machine assemblies, such as gears, motors, or shafts; and imbalance of machine assemblies, such as motors, rotors, gears, pistons and fans. The vibratory motion of such machine assemblies may be expressed in the form of a vibration signature, vibration footprint or "footprint", which may be graphically illustrated.

The present and future condition of machinery may be determined and predicted by analyzing predetermined vibration signatures of individual machinery. Determining the present and future condition of machinery is essential for maintaining such machinery on line and capable of contributing to an essential manufacturing process. The machinery to be studied may include rotating type machinery, such as but not limited to rotary screw type air compressors. Such rotary screw type air compressors typically supply the entire pneumatic requirements for a manufacturing facility. In such an example, if the rotary screw air compressors fail in their essential function, production at the manufacturing facility will most likely cease until such time as the fault condition is remedied or a back up pneumatic supply is located. This, of course, may cause a great loss of revenue for the affected manufacturing facility. Ideally, a potential fault condition of a machine should be identified as early as possible to permit a facility manager to schedule "down" time and machine maintenance in a cost effective manner.

In an effort to avoid the loss of revenue caused by "down" equipment, manufacturing facility managers have, in the past, employed independent firms that specialize in the field of predictive vibration monitoring of machinery. It is the purpose of such firms to supply personnel to a manufacturing facility for the purpose of performing on-site vibration monitoring. As is well known, in order to effectively perform predictive vibration monitoring of machinery, the "normal" vibration signatures of all the rotative components must be known before predictive vibration monitoring is performed. These "normal" vibration signatures of the rotative components serve as a benchmark from which to evaluate all other vibration signatures. Notwithstanding the foregoing, typically such independent firms performing predictive vibration monitoring do not know the "normal" vibration signatures of the machines to be monitored. Without the knowledge of such "normal" vibration signatures, predictive vibration monitoring programs may produce extremely inaccurate results, which is a problem presently plaguing this field. Such inaccurate results cause unnecessary repair of machines that are otherwise in sound operating condition, and cause the owners of such machines to file meritless warranty claims against the manufacturer of such machines.

As may be appreciated by one skilled in the art, any collection of vibration data for the purpose of predictive vibration monitoring must be performed under equal machine conditions to achieve accurate results. Present methods of collecting vibration data accomplish such data collection absent any accurate correlation to the running state of the monitored machine. For example, on a predetermined date, vibration data may be collected for a compressor under compressor loaded conditions. Thereafter vibration data may be collected for a compressor under compressor unloaded conditions. Inaccuracy will occur if the dissimilar collected vibration data is compared to predict the present and future condition of the monitored machine.

In addition to the foregoing, present methods of vibration data collection do not permit any integration between the vibration monitoring and a microprocessor based control system of the monitored machine. This lack of integration prevents any continuous logging of machine vibration data which would permit a significantly more accurate analysis of any gathered vibration data.

The foregoing illustrates limitations known to exist in present methods for collecting vibration data for the purpose of predicting and detecting changes in machinery condition. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a predictive vibration monitoring system for a machine. The predictive vibration monitoring system includes a microcontroller and a machine to be monitored. The machine to be monitored includes at least one rotative element. At least one sensor is operatively connected to the machine. The at least one sensor is operable to convert mechanical motion generated by the at least one rotative element into a corresponding electrical signal. The at least one sensor inputs the corresponding electrical signal to the microcontroller. A communication means is disposed between the microcontroller and the monitored machine. The communication means enables the microcontroller to correlate a predetermined operational state of the monitored machine with a corresponding electrical signal generated by the at least one sensor. A memory means communicates with the microcontroller and stores a predetermined logic routine, at least one corresponding electrical signal and at least one predetermined key frequency of the at least one rotative element of the machine to be monitored. The microcontroller utilizes the predetermined logic routine to process the corresponding electrical signal into corresponding vibration data of the monitored machine. The microcontroller compares the corresponding vibration data with the at least one predetermined key frequency to predict the present and future condition of the at least one rotative element.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
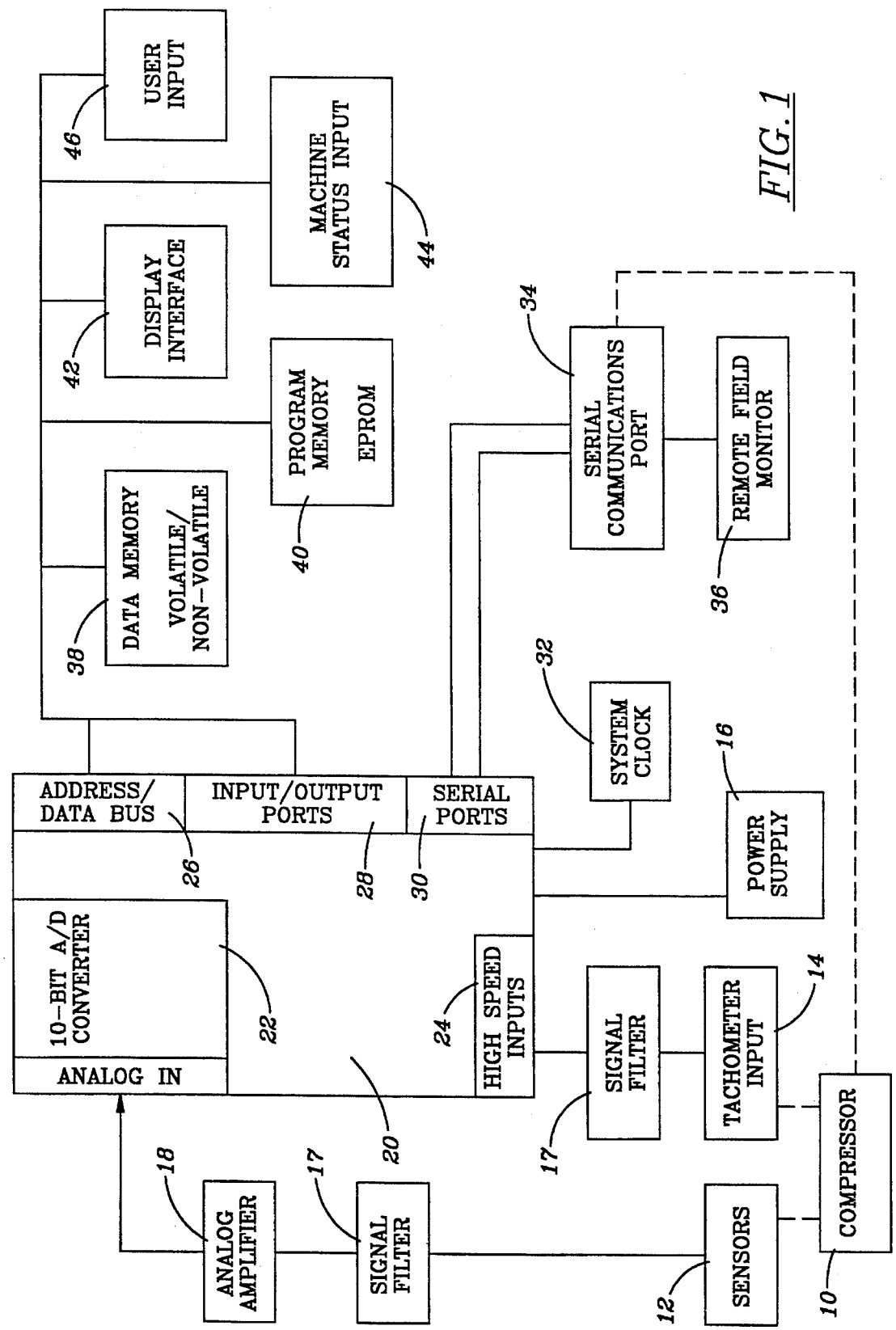
FIG. 1 is a functional block diagram of a vibration monitoring system in accordance with the teachings of the present invention.

Referring now to the drawings, wherein similar reference characters designate corresponding parts throughout the several views, FIG. 1 illustrates a functional block diagram of a vibration monitoring system in accordance with the teachings of the present invention. The vibration monitoring system of the present invention may be used with any type machine, such as but not limited to the following: gas compressors, including centrifugal compressors and rotary screw air compressors; pumps; blowers; turbines; engines or any other type machine having rotative components which have some degree of vibratory motion which generate characteristic vibration signatures.

Generally illustrated at 10 is a machine to be monitored, which in the embodiment illustrated is a rotary screw type air compressor. One or more sensors 12 communicate with the compressor 10. The sensors 12 are of the type which convert mechanical motion or energy into electrical signals. For example, the sensors 12 may be proximity probes, accelerometers or any other type sensors which are used in industrial applications to measure vibration. Each of the sensors 12 are attached to the compressor in predetermined locations to be monitored. For example, the sensors 12 may be attached to the compressor 10 in such a manner to analyze the vibratory motion of machine bearings (e.g. bearing races, or defective ball bearings), gears, motors, shafts, pistons or fans, for example. A tachometer input is shown at 14 which is a magnetic type pickup, and which is designed to determine rotational speed of a predetermined compressor element. A power supply 16 supplies the requisite electrical power to the vibration monitoring system. Signal filters are connected to the sensors 12 and the tachometer input 14 to precondition the electrical signals which are generated therefrom, and to suppress noise or other electrical magnetic interference. An optional analog amplifier is provided at 18 which is connected to the sensors 12, by way of the signal filter 17, and to a microcontroller 20. Analog amplifier 18 is required only if the signal generated by a sensor 12 is below a predetermined threshold voltage, such as 0 volts, for example. Typically, accelerometers produce such a voltage below 0 volts and require amplification.

In the embodiment of the vibration monitoring system described herein, the microcontroller 20 is a 16 bit unit. The microcontroller 20 should be of a type which is able to perform, at a minimum, the following functions: collect data quickly; analyze data quickly by employing a signal analysis algorithm, such as a fast Fourier transform algorithm (FFT algorithm); quickly store and move data between memory locations; and perform floating point calculations. A microcontroller which is known to be capable of performing these functions is an Intel® 80C196 series microcontroller. Signals from the sensors 12 are inputted to the microcontroller 20 through an A/D converter 22, such as a 10-bit type A/D converter, for example. The A/D converter operates to convert the real world analog signals which are generated by the sensors 12 to a digital format to be processed by the microcontroller 20. Signals from the tachometer input 14 are inputted to the microcontroller 20 through a high speed input 24.

The microcontroller outputs to an address data bus 26, input/out ports 28 and a serial port 30. The address data bus 26 is required to permit the microcontroller to communicate to peripherals, such as but not limited to a data memory 38, program memory 40, display interface 42, machine status input 44, and a user input 46, all of which will be described in further detail hereinafter. Input/output port 28 typically comprises digital inputs or outputs which may control such hardware functions as controlling a backlight on a display interface, or controlling light emitting diodes, for example. Serial port 30 permits the microcontroller 20 to communicate with another central processing unit or microcontroller, such as a microcontroller which may control operating functions of the compressor 10.

By way of the serial port 30, a microprocessor controlled machine, such as a microprocessor controlled compressor 10, may be integrated with the vibration monitoring system of the present invention. Such integration permits the vibration monitoring system to precisely correlate the state of the operating machine with the vibration data collected. Also, it is contemplated by the teachings herein that action commands may be generated by the microcontroller 20 and outputted through serial port 30 to the a monitored machine. For example, if the analyzed vibration signature would indicate an impending fault condition, a command signal may be outputted to the monitored machine by the microcontroller 20. This command signal may be of the type to control operations of the monitored machine or to cause alarm information to be displayed by the monitored machine. More than one serial port 30 may be included in the vibration monitoring system, if for example, the system is to be employed at a remote site. In such an embodiment of the present invention, a serial port 30 would be dedicated to the monitored machine and a second serial port would be employed to provide for communications between a remote field monitor 36 and the vibration monitoring system. Communications with the remote field monitor 36 would be accomplished via a modem which would permit data transfer to a remote site by way of cellular communications, radio frequency communications or telephone communications, for example.

The microcontroller 20 communicates with a system clock 32. A serial communications port 34 communicates with the one or more serial ports 30. The serial communications port may be either a RS485 or RS232 type communication port, however, an RS485 type serial communications port is preferred due to being more robust in an industrial environment. The serial communications port 34 is linked with a machine to be monitored, such as the compressor 10, and a remote field monitor 36.

The data memory 38 is a random access type memory (RAM) having both a volatile and a non-volatile memory component. Stored in non-volatile RAM is a digitized footprint or vibration signature of the machine to be monitored (e.g. FIG. 2). This footprint may be obtained initially at the facility at which the monitored machine is assembled, and/or the footprint may be obtained upon installation of the machine at a predetermined manufacturing site, as will be explained in further detail hereinafter. Also, stored in non-volatile RAM are predetermined values for all the key frequencies of the rotative elements of the machine to be monitored. These key frequency values will serve as a benchmark against which the microcontroller 20 will compare collected vibration signatures. By using an actual footprint of the machine to be monitored, and actual key frequencies of rotative elements, extremely accurate predictive vibration monitoring may be achieved.

The program memory 40, such as an erasable programmable read only memory (EPROM), stores the program for controlling a fast Fourier transform algorithm. The display interface 42 may include a liquid crystal display, a printer, cathode ray tube, or any other similar suitable display apparatus for visually depicting a vibration signature, such as the vibration signature illustrated in FIG. 2. The machine status input 44 provides for an interface which permits the microcontroller 20 to correlate the state of the machine to be monitored with collected predetermined vibration signatures from a machine which is not equipped with a microprocessor based controller. More particularly, in such a machine which is not equipped with a microprocessor based controller, the microcontroller 20 is unable to correlate collected vibration signatures with a predetermined machine state. For example, a rotary screw compressor may be operating in such states as "loaded", "unloaded", or "modulating". The machine status input 44 permits the integration of non-microprocessor controlled machines with the microcontroller 20 to provide for accurate predictive vibration monitoring in those instances. User input setup 46 is an apparatus for permitting a user to control the vibration monitoring system. For example, the user input setup may be a membrane panel with appropriate input type switches, or any other suitable type human/machine interface type apparatuses.

Figure 2:
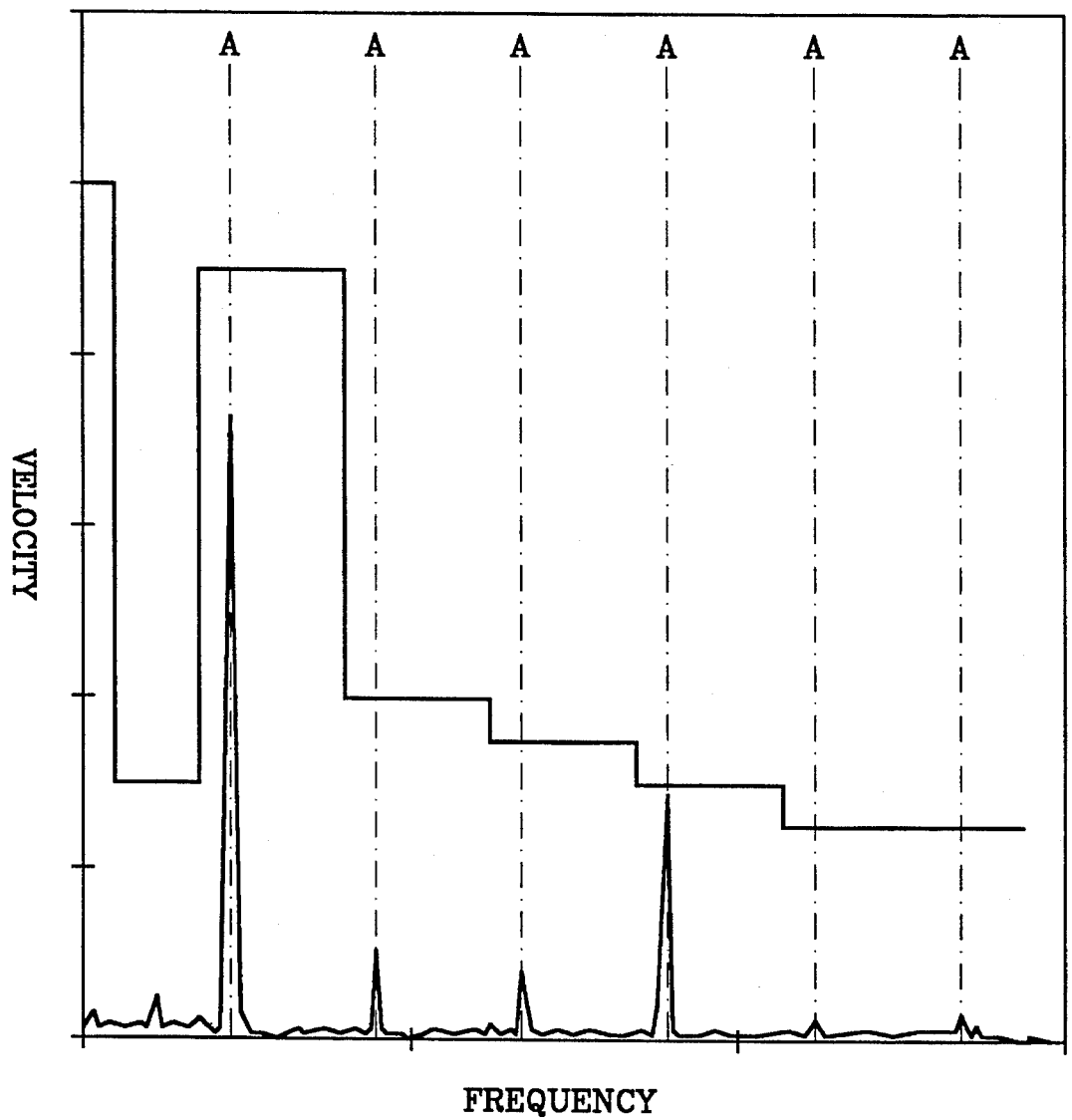
FIG. 2 is a predetermined spectral display or vibration signature (Frequency v. Velocity) for a machine.

FIG. 2 is an actual footprint or vibration signature which has been obtained under a known machine state, and from an individual sensor 12, having a known, predetermined location. Each sensor 12 provides vibration data to produce a single vibration signature. Overlying each vibration signature is an alarm level. The alarm level is employed by the vibration monitoring system to indicate predetermine maximum levels above which machine fault conditions may occur to the monitored machine.

Figure 3:
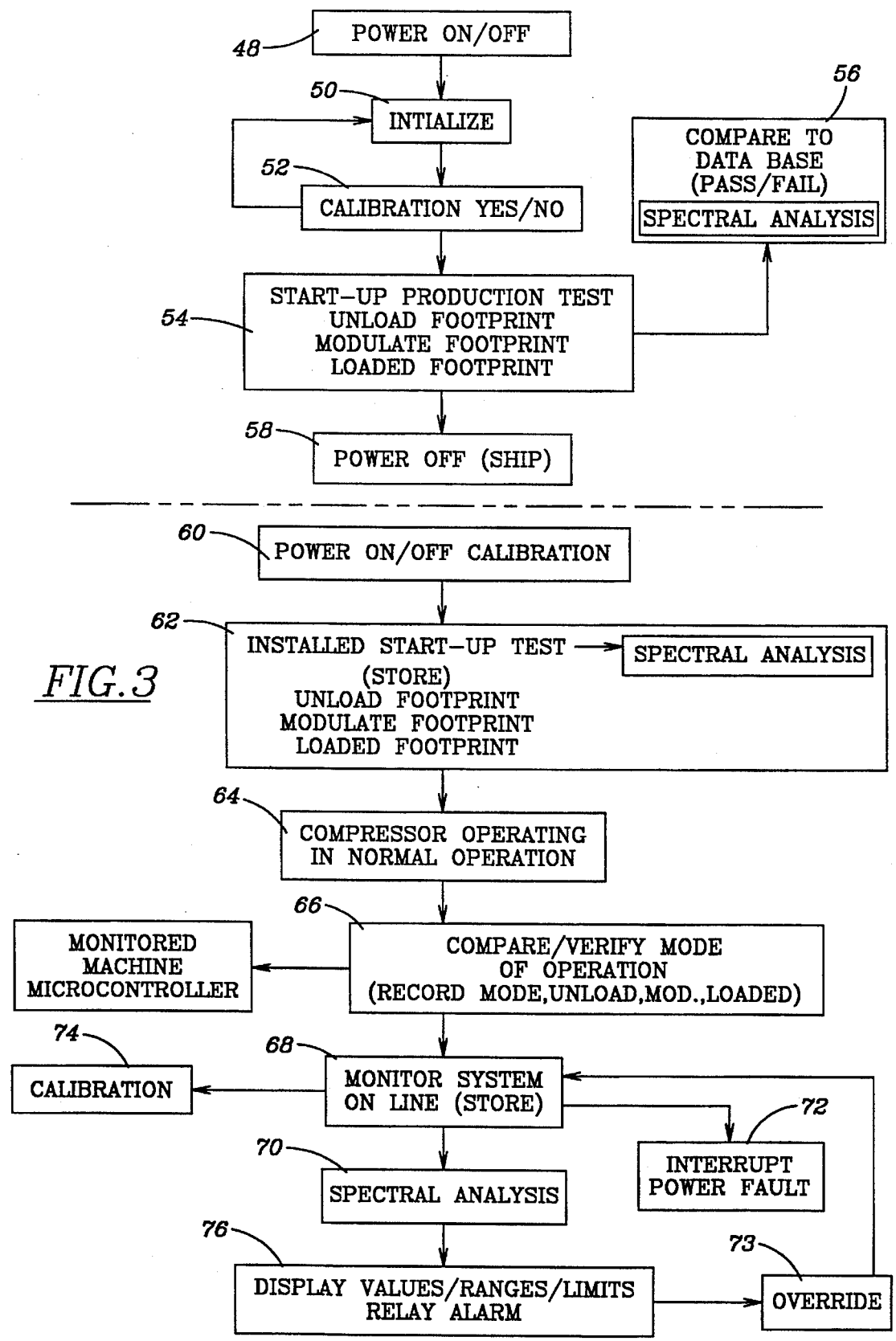
FIG. 3 is a chart depicting operation logic employed by the system of the present invention.

The requisite operational steps employed by the vibration monitoring apparatus of the present invention are detailed in FIG. 3. As should be understood, the vibration monitoring system of the present invention may be installed in a newly manufactured compressor as original equipment. Alternatively, the vibration monitoring system may be supplied as a retrofit assembly in compressors already existing at site locations. The operational steps detailed in FIG. 3 are based upon an original equipment type vibration monitoring system.

During the assembly of a newly manufactured machine, such as the rotary screw air compressor 10, electrical power is applied to power supply 16 at block 48. Thereafter, the microcontroller 20 is initialized at block 50. During initialization, a predetermined logic routine is executed which accomplishes such tasks as determining the software revision resident in the program memory 40; identifying the machine to be monitored and the rotative elements to be monitored; identifying the number of sensors present within the vibration monitoring system; and determining the state of the various sub-assemblies of the vibration monitoring system, such as but not limited to, the data memory 38, the program memory 40, the display interface 42, and the microcontroller 20. Upon completion of the initialization at block 50, a calibration test is accomplished at block 52.

Calibration data and a predetermined calibration subroutine are retrieved by the microcontroller 20 from the data memory 38. If the calibration test is passed, operational step 52 is advanced to step 54 where a start-up production test is performed upon the machine to be monitored. If the calibration test is failed, the microcontroller 20 returns the system logic to the initialization step at 50. The calibration step employs a predetermined calibration circuit containing a built in signal to simulate signals generated by the sensors 12 to the microcontroller 20 for self calibrating or zero offsetting purposes. The calibration step 52 also includes the following: determination of the status of the power supply 16 and the excitation voltage to the sensors 12; determination of the status of sensor connections to confirm the number of sensors employed by the vibration monitoring system; and determination of the status of the outputs of the vibration monitoring system.

At the manufacturing facility of the machine to be monitored, a start-up production test is accomplished which is represented at block 54. The start-up production test is performed during operation of the machine to be monitored, during which initial vibration data is collected. It is the purpose of the start-up production test to compile the initial vibration data into various benchmark footprints for different operating states of the machine to be monitored. For example, in the case of a rotary screw compressor, a footprint is established for an "unloaded" state, a "loaded" state, or a "modulating" type state, for example. The various footprints are then digitized and stored within the data memory 38. At step 56 the initial vibration data is compared to the key frequencies of the rotative elements of the machine to be monitored, which have also been stored within the data memory 38. The data analysis which is accomplished at step 56 determines whether the initial vibration footprints are within the acceptable frequency ranges of the rotative elements of the machine to be monitored. If the initial vibration footprints are within such acceptable frequency ranges of the rotative elements, the machine is determined to be suitable for shipment which is accomplished at block 58. Conversely, if the initial vibration footprints are determined to be out of range, the machine is determined to be unfit for shipment, and the machine is inspected to locate the source of the fault condition.

Upon arriving at an operational site, and after the machine to be monitored is permanently installed, power is supplied to the machine and the machine is calibrated at step 60. Thereafter, an installed start-up test is performed at step 62. The installed start-up test is similar to the start-up production test. The purpose of the installed start-up test is to compile initial benchmark vibration data for the installed machine to be monitored. As should be understood, when a machine, such as a rotary screw air compressor is installed, floor mounting systems, absorption pads, and/or vibration mounts may alter a machine's vibration signature. Therefore, predictive vibration monitoring is based upon the vibration data compiled by the installed start-up test. As with the start-up production test, the vibration data for the installed start-up test is digitized and stored within the data memory 38. Also at step 62, the initial vibration data is compared to the key frequencies of the rotative elements which were previously stored within the data memory. If the vibration footprints for the installed machine are within the acceptable frequency ranges of the rotative elements, the machine is determined to be suitable for operation, which is represented at step 64. Conversely, if the initial vibration footprints are determined to be out of range, the machine is inspected to locate the source of the fault condition.

Vibration data is collected at user selected time intervals at step 66. Throughout the collection of vibration data, the system microcontroller 20 interacts with a microcontroller of the compressor 10 to thereby correlate the machine state with the vibration data collected. In the situation where the machine to be monitored is not equipped with a microcontroller, the microcontroller interacts with the machine status input 44 to correlate machine state with the vibration data collected. The collected vibration data is then stored at step 68 in the data memory 38 such that a spectral analysis, step 70, may be performed thereupon. At predetermined time intervals a calibration function is accomplished at step 74 similar to the calibration function accomplished at step 52. Additionally, at predetermined time intervals, an initialization function is accomplished at step 72 similar to step 50. Data obtained from the spectral analysis performed at steps 56, 62 and 70 may be displayed at step 76 by way of the display interface 42. Also, during operation of the monitored machine, commands may be provided at step 76 to control the operation of the monitored machine when the value of predetermined vibration data exceeds the stored key frequency values. An override is provided at step 73 to inhibit the transmission of alarm commands to the monitored machine during predetermined user selected time periods.

Figure 3A:
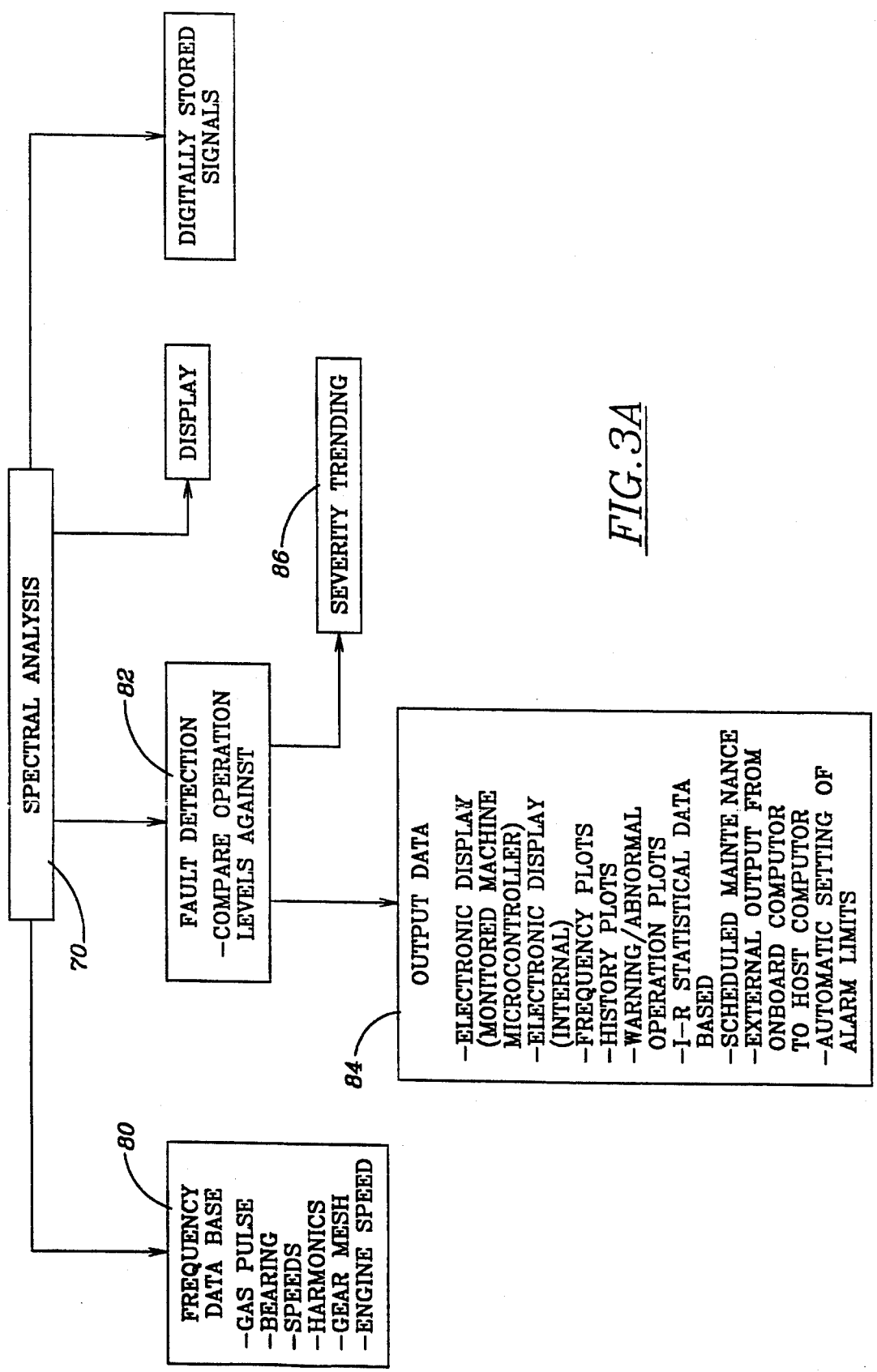
FIG. 3A is a chart highlighting the spectral analysis step 70 of FIG. 3.

The spectral analysis performed at steps 56, 62 and 70 employs a fast Fourier transform algorithm to obtain a vibration signature from collected vibration data generated by signals from the sensors 12 and 14. This is accomplished by converting a real time domain signal and converting this signal to a frequency domain to permit predictive vibration monitoring. The fast Fourier transform algorithm is digitally controlled and permits predetermined frequencies of the rotative elements of the monitored machine to be isolated for analysis. In order to accurately perform predictive vibration monitoring, the vibration signatures generated by the fast Fourier transform algorithm are compared with the following: the benchmark vibration signatures stored in the data memory 38; the key frequency values for the rotative elements of the monitored machine which are stored in the data memory; and previously obtained vibration signatures. Turning to FIG. 3A, examples of the type of key frequencies which are stored within the data memory 38 are outlined in block 80, namely gas pulse frequencies and harmonics thereof, bearing frequencies, and gear mesh frequencies, for example. The spectral analysis performed at step 70 is utilized by the vibration monitoring system of the present invention to perform fault detection at step 82. The fault detection is accomplished by comparing the vibration signatures obtained during operation of the monitored machine with any suitable output data, such as that listed at step 84, or by comparing the vibration signatures with severity trending at step 86. For example, if an unaccounted for frequency rise occurs between two known gas pulse frequencies, a determination can be made as to the cause of such a frequency rise, such as a failing rotative component, for example.

While this invention has been illustrated and described in accordance with a preferred embodiment, it is recognized that variations and changes may be made therein without departing from the invention as set forth in the following claims.

Having described the invention, what is claimed is:

1. A predictive vibration monitoring system for a machine, the system comprising:

a machine to be monitored, the machine having at least one operational state and at least one rotative element, each of the at least one rotative elements adapted to generate a benchmark vibration signature for each of the at least one machine operational states, and an operational vibration signature for each of the at least one operational states of the machine;

a microcontroller;

at least one sensor operatively connected to the machine, the at least one sensor being of the type which converts mechanical motion generated by the at least one rotative element into a corresponding electrical signal, the at least one sensor inputting the corresponding electrical signal to the microcontroller;

communication means for enabling the microcontroller to communicate with the monitored machine thereby enabling the microcontroller to correlate the operational state of the monitored machine with the corresponding electrical signal generated by the at least one sensor;

memory means, communicating with the microcontroller, for storing a predetermined logic routine, at least one corresponding electrical signal, each of the benchmark vibration signatures for each of the at least one rotative elements; and at least one predetermined key frequency of the at least one rotative element of the machine to be monitored; and the microcontroller utilizing the predetermined logic routine to process the corresponding electrical signal into a corresponding operational vibration signature of the monitored machine, the microcontroller comparing the corresponding operational vibration signature with both the at least one predetermined key frequency and with the benchmark vibration signature to predict the present and future condition of the at least one rotative element.

2. A vibration monitoring system for a compressor, the system comprising:

a compressor to be monitored, the compressor having at least one rotative element, and at least one operating state, each of the at least one rotative elements adapted to generate a benchmark vibration signature for each of the compressor operational states, and also to generate an operational vibration signature for each of the at least one compressor operational states;

a microcontroller;

at least one sensor operatively connected to the compressor, the at least one sensor converting mechanical motion generated by the at least one rotative element into a corresponding electrical signal, the at least one sensor inputting the corresponding electrical signal to the microcontroller;

memory means, communicating with the microcontroller, for storing a predetermined logic routine, at least one corresponding electrical signal; each of the benchmark vibration signatures for each of the at least one rotative elements; and at least one predetermined key frequency of the at least one rotative element of the compressor to be monitored; the microcontroller utilizing the predetermined logic routine to process the corresponding electrical signal into a corresponding operational vibration signature of the monitored compressor, the microcontroller comparing the corresponding operational vibration signature with the at least one predetermined key frequency and the benchmark vibration signature to predict the present and future condition of the at least one rotative element.

3. A vibration monitoring system, as claimed in claim 2, further including a communication means for enabling the microcontroller to communicate with the monitored compressor thereby enabling the microcontroller to correlate a predetermined operational state of the monitored compressor with a corresponding electrical signal generated by the at least one sensor.

4. A vibration monitoring system, as claimed in claim 2, further including a signal filter means, which communicates with the at least one sensor, for preconditioning the corresponding electrical signal, and for suppressing electrical and magnetic signals generated from outside the vibration monitoring system.

5. A vibration monitoring system, as claimed in claim 2, and wherein the at least one sensor is a proximity probe.

6. A vibration monitoring system, as claimed in claim 2, and wherein the at least one sensor is an accelerometer.

7. A vibration monitoring system, as claimed in claim 6, further including an analog amplifier connected to the accelerometer.

8. A vibration monitoring system, as claimed in claim 2, the microcontroller processing the corresponding electrical signal into corresponding vibration data by employing a fast Fourier transform algorithm.

9. A vibration monitoring system, as claimed in claim 2, further including a communication means for enabling the microcontroller to communicate the corresponding vibration data to a predetermined location remote to the vibration monitoring system.

10. A vibration monitoring system, as claimed in claim 2, further including means for displaying the corresponding operational vibration signature.

11. A vibration monitoring system, as claimed in claim 2, further including a means for inputting user selected data into the microcontroller.

12. A system for monitoring the vibration of at least one rotative element of a machine to determine the present condition, and to predict the future condition, of the at least one rotative element, the vibration monitoring system comprising:

a microprocessor controlled machine to be monitored, the machine having at least one rotative element, the machine having at least one operational state and each of the at least one rotative elements adapted to generate a benchmark vibration signature, and an operational vibration signature for each of the machine operational states;

a microcontroller;

at least one sensor operatively connected to the machine, the at least one sensor converting mechanical motion generated by the at least one rotative element into a corresponding electrical signal, the at least one sensor inputting the corresponding electrical signal to the microcontroller;

communication means for enabling the microcontroller to communicate with the monitored machine thereby enabling the microcontroller to correlate a predetermined operational state of the monitored machine with a corresponding electrical signal generated by the at least one sensor;

memory means, communicating with the microcontroller, for storing a predetermined logic routine, the benchmark vibration signatures; at least one corresponding electrical signal and at least one predetermined key frequency of the at least one rotative element of the machine to be monitored; and the microcontroller utilizing the predetermined logic routine to process the corresponding electrical signal into a corresponding operational vibration signature of the monitored machine, the microcontroller comparing the corresponding operational vibration signature with the at least one predetermined key frequency and with the benchmark vibration signature to determine the present and to predict the future condition of the at least one rotative element, the microcontroller interacting with the microprocessor of the monitored machine such that the microcontroller communicates predetermined operational commands to the monitored machine in response to the determined present condition, and the predicted future condition, of the at least one rotative element.

13. A vibration monitoring system, as claimed in claim 12, further including a signal filter means, which communicates with the at least one sensor, for preconditioning the predetermined electrical signal, and for suppressing electrical and magnetic signals generated from outside the vibration monitoring system.

14. A vibration monitoring system, as claimed in claim 12, and wherein the at least one sensor is a proximity probe.

15. A vibration monitoring system, as claimed in claim 12, and wherein the at least one sensor is an accelerometer.

16. A vibration monitoring system, as claimed in claim 15, further including an analog amplifier connected to the accelerometer.

17. A vibration monitoring system, as claimed in claim 12, the microcontroller processing the corresponding electrical signal into corresponding vibration data by employing a fast Fourier transform algorithm.

18. A vibration monitoring system, as claimed in claim 12, further including a communication means for enabling the microcontroller to communicate the corresponding operational vibration signature to a predetermined location remote to the vibration monitoring system.

19. A vibration monitoring system, as claimed in claim 12, further including a means for displaying the corresponding operational vibration signature.

20. A vibration monitoring system, as claimed in claim 12, including a means for inputting user selected data into the microcontroller.

21. A predictive vibration monitoring system comprising:

a compressor to be monitored, the compressor having at least one operational state and at least one rotative element, each of the at least one rotative elements adapted to generate a benchmark vibration signature for each compressor operational state, and an operational vibration signature;

a microcontroller;

at least one sensor operatively connected to the compressor, the at least one sensor generating a signal corresponding to motion of the at least one rotative element, the at least one sensor inputting the signal to the microcontroller;

a signal filter means, which communicates with the at least one sensor, for preconditioning the signal, and for suppressing signals generated from outside the predictive vibration monitoring system;

communication means for enabling the microcontroller to correlate a predetermined operational state of the monitored compressor with a signal generated by the at least one sensor;

memory means, communicating with the microcontroller, for storing a predetermined logic routine, at least one signal, each of the benchmark signatures for each of the at least one rotative elements; and at least one predetermined key frequency of the at least one rotative element of the compressor to be monitored;

a means for inputting user selected data into the microcontroller;

the microcontroller utilizing the predetermined logic routine which executes a fast Fourier transform algorithm to process the signal into a corresponding operational vibration signature of the monitored compressor, the microcontroller comparing the corresponding operational vibration signature with both the benchmark vibration signature and at least one predetermined key frequency to determine the present, and to predict the future condition of the at least one rotative element, the microcontroller interacting with the microprocessor of the monitored compressor such that the microcontroller communicates predetermined operational commands to the monitored compressor in response to the determined present condition, and the predicted future condition, of the at least one rotative element; and means for displaying the corresponding operational vibration signature.

* * * * *